(12) United States Patent
Wang et al.

(10) Patent No.: US 9,544,769 B2
(45) Date of Patent: *Jan. 10, 2017

(54) METHOD FOR PROVIDING APPLICATION SERVICE

(71) Applicants: Minsheng Wang, Shenzhen (CN); Wei Lu, Shenzhen (CN); Xiaojun Liu, Shenzhen (CN); Wuqiang Lin, Shenzhen (CN)

(72) Inventors: Minsheng Wang, Shenzhen (CN); Wei Lu, Shenzhen (CN); Xiaojun Liu, Shenzhen (CN); Wuqiang Lin, Shenzhen (CN)

( * ) Notice: Subject to any disclaimer, the term of this patent is extended or adjusted under 35 U.S.C. 154(b) by 35 days.

This patent is subject to a terminal disclaimer.

(21) Appl. No.: 14/886,587

(22) Filed: Oct. 19, 2015

(65) Prior Publication Data
US 2016/0044508 A1 Feb. 11, 2016

Related U.S. Application Data

(63) Continuation of application No. 14/142,946, filed on Dec. 30, 2013, now Pat. No. 9,198,036, which is a
(Continued)

(51) Int. Cl.
*H04W 12/04* (2009.01)
*H04L 9/32* (2006.01)
(Continued)

(52) U.S. Cl.
CPC ............ *H04W 12/04* (2013.01); *H04L 9/0861* (2013.01); *H04L 9/3231* (2013.01);
(Continued)

(58) Field of Classification Search
CPC ... H04W 12/04; H04W 12/06; H04L 63/0428; H04L 9/0861; H04L 9/3231; H04L 2209/80

See application file for complete search history.

(56) References Cited

U.S. PATENT DOCUMENTS

| | | | | |
|---|---|---|---|---|
| 6,098,054 | A | * | 8/2000 | McCollom ............ G06F 21/121 705/51 |
| 2002/0016774 | A1 | * | 2/2002 | Pendlebury ............ G06F 21/10 705/51 |

(Continued)

FOREIGN PATENT DOCUMENTS

| CN | 101321069 A | 12/2008 |
|---|---|---|
| CN | 101330386 A | 12/2008 |
| CN | WO 2013000144 A1 * | 1/2013 ........... H04L 9/3231 |

OTHER PUBLICATIONS

Chinese-to-English Machine Translation (Google Translate) of WIPO Pub. No. WO2013000144 A1.*

*Primary Examiner* — Joseph P Hirl
*Assistant Examiner* — J. Brant Murphy
(74) *Attorney, Agent, or Firm* — Na Xu; IPro, PLLC

(57) ABSTRACT

A method for providing application service is provided. The method discloses that a user is authenticated according to a received application service acquisition request from a user mobile phone, and when the user authentication is passed, the application service acquisition request is sent to an application server, so that the application server provides an application service to the user mobile phone according to the application service acquisition request. The application server does not need to authenticate the user mobile phone by performing an authentication operation on the user mobile phone through a wireless application protocol gateway, thus being capable of reducing the workload of the application server.

1 Claim, 2 Drawing Sheets

Related U.S. Application Data continuation of application No. PCT/CN2011/076634, filed on Jun. 30, 2011.

(51) Int. Cl.
*H04W 12/06* (2009.01)
*H04L 9/08* (2006.01)
*H04L 29/06* (2006.01)

(52) U.S. Cl.
CPC ......... *H04L 63/0428* (2013.01); *H04W 12/06* (2013.01); *H04L 2209/80* (2013.01)

(56) References Cited

U.S. PATENT DOCUMENTS

| | | | |
|---|---|---|---|
| 2002/0152391 A1* | 10/2002 | Willins | H04L 9/3231 713/186 |
| 2005/0279826 A1* | 12/2005 | Merrien | G06Q 20/341 235/380 |
| 2006/0242693 A1 | 10/2006 | Kussmaul | |
| 2009/0310779 A1* | 12/2009 | Lam | G06K 9/00093 380/46 |
| 2010/0049987 A1* | 2/2010 | Ettorre | G06F 21/32 713/186 |

* cited by examiner

METHOD FOR PROVIDING APPLICATION SERVICE

CROSS REFERENCE TO RELATED APPLICATIONS

This application is a continuation of U.S. patent application Ser. No. 14/142,946, filed on Dec. 30, 2013, which is a continuation of International Application No. PCT/CN2011/076634, filed on Jun. 30, 2011, both of which are hereby incorporated by reference in its entirety.

FIELD OF THE INVENTION

The invention relates to the field of communication technologies, and in particular, to a method for providing application service, wireless application protocol gateway and system.

BACKGROUND OF THE INVENTION

With the development of wireless communication technology, functions implemented by a wireless terminal such as a mobile phone are more and more powerful. A mobile phone application is application software running on the mobile phone. The application software implements various functions of the mobile phone through an API (Application Programming Interface, application programming interface) extended from an underlayer of the mobile phone. Usually, this mobile phone application has two ways: off-line application and online application. After application startup, the offline application does not need network support any longer and runs independently at a mobile phone terminal. The online application requires network interaction, and cannot run independently if departing from a network environment.

In the existing online applications, a user mobile phone is connected with a WAPGW (Wireless Application Protocol Gateway, wireless application protocol gateway) through a wireless network, and then is accessed into Internet through the wireless application protocol gateway. The wireless application protocol gateway can only perform simple management operations, for example: target service shielding. Moreover, some online applications can directly access the Internet through switching an access point, and bypassing the wireless application protocol gateway.

The prior art at least has the following problems: the wireless application protocol gateway only provides a network channel for accessing the application of the wireless terminal During access, the security of an application server is very poor during accessing. The application server only uses a simple password authentication to authenticate the user mobile phone currently, which does not have strong security. Moreover, the user needs to enter a password for each access service, which is inconvenient to use, and causes poor user experience.

SUMMARY OF THE INVENTION

The embodiments of the present invention provide a method for providing application service, wireless application protocol gateway and system, which can reduce the workload of an application server, improve security and experience of users.

An embodiment of the present invention provides a method for providing application service, comprising:

step A. registering user fingerprint information to a wireless application protocol gateway; wherein the step A comprises:
- A1. inputting, by the user, fingerprints on a touch screen of a user mobile phone; generating, by the user mobile phone, first fingerprint data of the user, and sending the first fingerprint data to the wireless application protocol gateway through an encrypted channel;
- A2. acquiring, by the wireless application protocol gateway, an encrypted fingerprint template of the user and an encryption key KEY corresponding to the encrypted fingerprint template from an application server through the encrypted channel, and saving the encrypted fingerprint template locally, wherein the encryption key KEY is generated randomly by the application server, the length of the encryption key KEY is 128 bits, and the encrypted fingerprint template is generated after the application server uses the encryption key KEY to encrypt a user fingerprint template;
- A3. generating, by the wireless application protocol gateway, security authentication data according to the first fingerprint data and the encryption key; saving the security authentication data locally; and destroying the encryption key;

step B. inputting, in a user mobile phone, application service information to be acquired, and inputting fingerprints on a touch screen of the user mobile phone;

step C. collecting, by the user mobile phone, the user fingerprints to generate second fingerprint data of the user, carrying the second fingerprint data in an application service acquisition request, and sending the application service acquisition request to the wireless application protocol gateway through an encrypted channel;

step D. receiving, by the wireless application protocol gateway, the application service acquisition request carrying the second fingerprint data from the user mobile phone, and extracting the second fingerprint data from the application service acquisition request;

step E. acquiring, by the wireless application protocol gateway, the security authentication data stored locally, according to information of the user mobile phone;

step F. acquiring, by the wireless application protocol gateway, the encryption key KEY according to the second fingerprint data and the security authentication data;

step G. decrypting, by the wireless application protocol gateway, the encrypted fingerprint template according to the obtained encryption key KEY, to obtain the fingerprint template of the user;

step H. comparing, by the wireless application protocol gateway, the acquired second fingerprint data with the fingerprint template of the user, determining that the user identity authentication is passed when a comparison result is that the two are matched, and sending the application service acquisition request to the application server;

step I. sending, by the application server, requested application service to the wireless application protocol gateway according to the application service acquisition request.

step J. providing, by the wireless application protocol gateway, the application service to the user mobile phone.

An embodiment of the present invention provides a wireless application protocol gateway, comprising:

a receiving unit, a memory, an authenticating unit, a determining unit, a decrypting unit and a sending unit, wherein:

the receiving unit is configured to receive first fingerprint data generated by a user mobile phone;

the memory is configured to store an encrypted fingerprint template of the user and an encryption key KEY corresponding to the encrypted fingerprint template both of which are acquired from an application server through an encrypted channel; wherein the encryption key KEY is generated randomly by the application server; a length of the encryption key KEY is 128 bits; the encrypted fingerprint template is generated after the application server uses the encryption key KEY to encrypt a user fingerprint template;

the authenticating unit is configured to generate security authentication data according to the first fingerprint data and the encryption key; save the security authentication data locally; and destroy the encryption key;

the determining unit is configured to receive an application service acquisition request carrying second fingerprint data from a user mobile phone, extract the second fingerprint data from the application service acquisition request; acquire the security authentication data saved locally, according to information of the user mobile phone; compute the encryption key KEY according to the second fingerprint data and the security authentication data;

the decrypting unit is configured to decrypt the encrypted fingerprint template according to the obtained encryption key KEY, so as to obtain the fingerprint template of the user; compare the acquired second fingerprint data with the fingerprint template of the user, determine that the user identity authentication is passed when a comparison result is that the two are matched, and send the application service acquisition request to the application server.

the sending unit is configured to provide the application service obtained from the application server, to the user mobile phone.

An embodiment of the present invention provides a network system, comprising:

a user mobile phone, a wireless application protocol gateway and an application server, wherein the user mobile phone is configured to send first fingerprint data to the wireless application protocol gateway, and the wireless application protocol gateway comprises: a receiving unit, a memory, an authenticating unit, a determining unit, a decrypting unit and a sending unit; wherein:

the receiving unit is configured to receive first fingerprint data generated by a user mobile phone;

the memory is configured to store an encrypted fingerprint template of the user and an encryption key KEY corresponding to the encrypted fingerprint template both of which are acquired from an application server through an encrypted channel; wherein the encryption key KEY is generated randomly by the application server; a length of the encryption key KEY is 128 bits; the encrypted fingerprint template is generated after the application server uses the encryption key KEY to encrypt a user fingerprint template;

the authenticating unit is configured to generate security authentication data according to the first fingerprint data and the encryption key; save the security authentication data locally; and destroy the encryption key;

the determining unit is configured to receive an application service acquisition request carrying second fingerprint data from a user mobile phone, extract the second fingerprint data from the application service acquisition request; acquire the security authentication data saved locally, according to information of the user mobile phone; compute the encryption key KEY according to the second fingerprint data and the security authentication data;

the decrypting unit is configured to decrypt the encrypted fingerprint template according to the obtained encryption key KEY, so as to obtain the fingerprint template of the user; compare the acquired second fingerprint data with the fingerprint template of the user, determine that the user identity authentication is passed when a comparison result is that the two are matched, and send the application service acquisition request to the application server.

the sending unit is configured to provide the application service obtained from the application server, to the user mobile phone.

According to the method for providing application service in the embodiments of the invention, a user is authenticated according to a received application service acquisition request from a user mobile phone, and when the user authentication is passed, the application service acquisition request is sent to an application server, so that the application server provides application service to the user mobile phone according to the application service acquisition request. The application server does not need to authenticate the user mobile phone by performing an authentication operation on the user mobile phone through a wireless application protocol gateway, thus being capable of reducing the workload of the application server. In addition, the user registers first fingerprint data to the wireless application protocol gateway. The wireless application protocol gateway acquires an encrypted fingerprint template of the user and an encryption key KEY corresponding to the encrypted fingerprint template. The wireless application protocol gateway generates security authentication data for the encryption key by using the first fingerprint data to conceal the encryption key, so that the encryption key is protected more rigorously. During authentication, the security authentication data is decrypted to obtain the encryption key by using second fingerprint data of the user, and the encrypted fingerprint template is decrypted to obtain a fingerprint template by using the encryption key, so that an authentication process is more secure and reliable. Moreover, the user is only required to input fingerprints on a touch screen of the mobile phone, which improves experience of the user.

DETAILED DESCRIPTION OF THE INVENTION

To illustrate the advantages of the technical solutions of the invention more clearly, the following introduces the invention in details with reference to the attached drawings and embodiments.

Embodiment I

Figure 1:
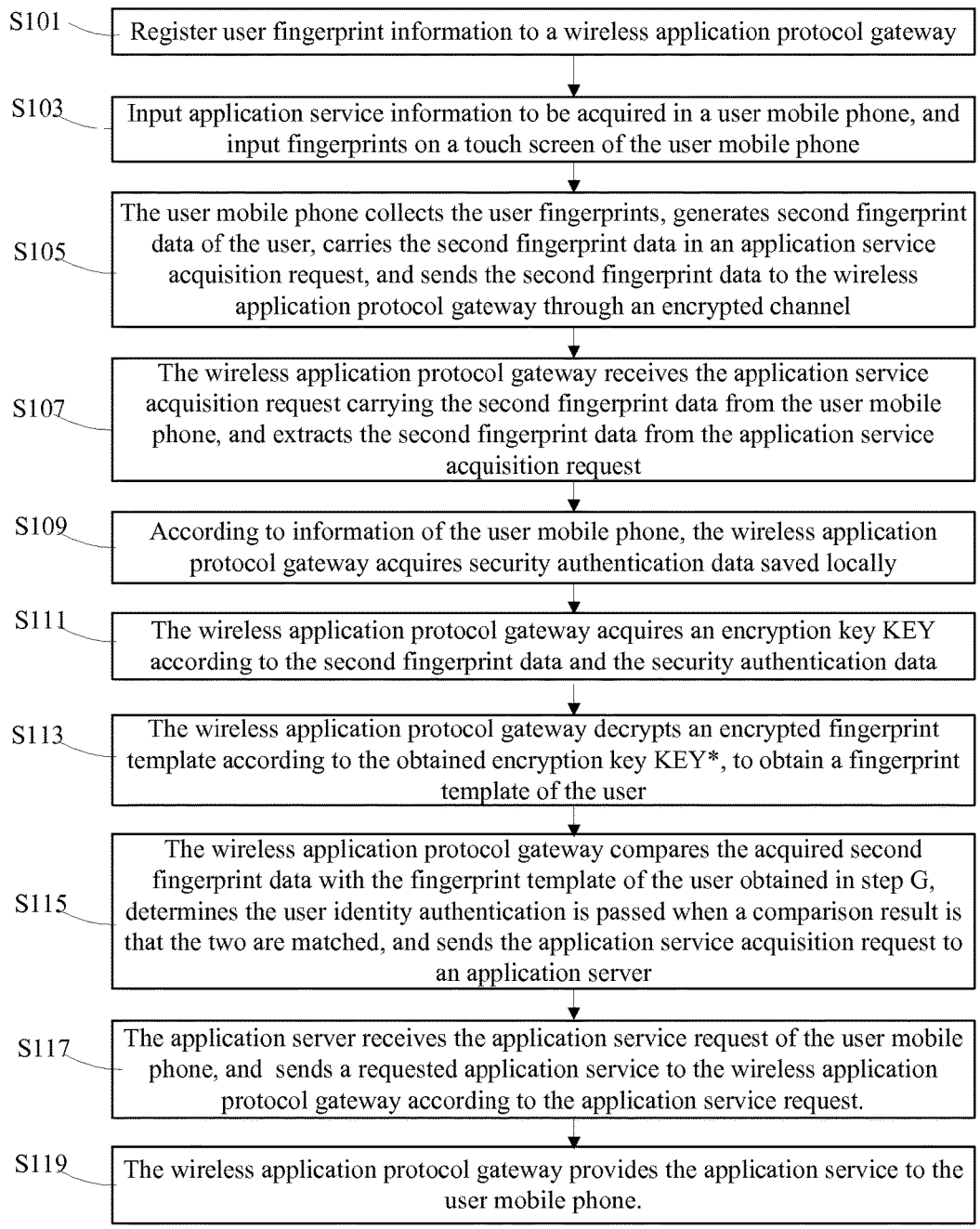
FIG. 1 is a flowchart of a method according to embodiment one of the present invention.

The embodiment provides a method for providing an application service. As shown in FIG. 1, the method includes:

Step 101: A user registers user fingerprint information to a wireless application protocol gateway, which specifically includes:

The user inputs fingerprints on a touch screen of a user mobile phone.

The user mobile phone collects the user fingerprints to generate first fingerprint data of the user, and sends the first fingerprint data to the wireless application protocol gateway through an encrypted channel.

The wireless application protocol gateway acquires an encrypted fingerprint template of the user and an encryption key KEY corresponding to the encrypted fingerprint template from an application server through the encrypted channel, and saves the encrypted fingerprint template at the wireless application protocol gateway locally. The encryption key KEY is generated randomly by the application server. A length of the encryption key KEY is 128 bits. The encrypted fingerprint template is generated after the application server uses the encryption key KEY to encrypt a user fingerprint template.

The wireless application protocol gateway generates security authentication data according to the first fingerprint data and the encryption key, which specifically includes:

The wireless application protocol gateway generates an encryption function of nine variables:

$$f(u) = a^T u \bmod(p) = (a_0 u_0 + a_1 u_1 + \ldots + a_7 u_7 + a_8 u_8) \bmod(p).$$

$a = [a_0\ a_1\ \ldots\ a_8]^T$, $u = [u_0\ u_1\ \ldots\ u_8]$, and mod represents a modulo operation.

The encryption key KEY is split into eight non-overlapping segments, which are respectively $s_0, s_1, \ldots, s_7$. Each segment has 16 bits. Set $a_0 = s_0, a_1 = s_1, \ldots, a_7 = s_7$. Connect $a_0$-$a_7$ into a 128 bit string KEYC=$a_0\ a_1\ \ldots\ a_7$, calculate a cyclic redundancy check CRC-16 value C of the string KEYC. C is a 16 bit check value. Set $a_8 = C \bmod(p)$. P is a prime number 65537 that is proximate to $2^{16}-1$ but larger than $2^{16}-1$.

Acquire a set $F = \{(x_0, y_0), (x_1, y_1), \ldots, (x_{N-1}, y_{N-1})\}$ of minutiae plane coordinates in the first fingerprint data of the user, where $x_i, y_i (i=0, \ldots, N-1)$ are respectively minutiae plane coordinates, and N is the total number of the minutiae. Each minutiae plane coordinate is respectively mapped into [0, 255] and the mapped plane coordinates are connected in series together to constitute 16 bit data $m_i$ and obtain a set $H = \{m_0, m_1, \ldots, m_{N-1}\}$.

Take each $m_i (i=0, \ldots, N-1)$ as a 16 bit random number generator seed to generate eight random numbers $r_{i1}, r_{i2}, \ldots, r_{i8}$ in sequence, and obtain a vector $u_i : u_i(m_i) = [u_{i0}\ u_{i1}\ \ldots\ u_{i8}] = [m_i\ r_{i1}\ \ldots\ r_{i8}]$.

Substitute each $u_i$ into the encryption function f(u) to calculate a corresponding encryption function value $f(u_i)$, and obtain a set G wherein G is a set of the user encrypted fingerprint data constituted by the set H and the encryption function value corresponding to the elements thereinto, and $G = ((m_0, f(u_0(m_0))), (m_1, f(u_1(m_1))), \ldots, (m_{N-1}, f(u_{N-1}(m_{N-1}))))$.

Generate an interference set $C = ((c_0, d_0), (c_1, d_1), \ldots, (c_{M-1}, d_{M-1}))$, where M is the number of elements of the set C; $c_i$ and $d_i (i=0, \ldots, M-1)$ are random numbers, and a distance between $c_i$ and $m_i$ is larger than a preset threshold value. Moreover, $d_i \neq f(c_i)$.

Mix the elements in the set G and in the set C randomly, to generate the security authentication data $VL = \{(v_0, w_0), (v_1, w_1), \ldots, (v_{M+N-1}, w_{M+N-1})\}$, where $(v_i, w_i)(i=0, \ldots, M-1)$ represents the elements in the set G and in the set C.

Save the security authentication data locally.

The wireless application protocol gateway destroys the encryption key, so as to ensure that the encryption key may not be disclosed.

Step 103: The user inputs application service information to be acquired in a user mobile phone and inputs the fingerprints on a touch screen of the user mobile phone.

Step 105: The user mobile phone collects the user fingerprints to generate second fingerprint data of the user, carries the second fingerprint data in an application service acquisition request, and sends the application service acquisition request to the wireless application protocol gateway through an encrypted channel.

Step 107: The wireless application protocol gateway receives the application service acquisition request carrying the second fingerprint data from the user mobile phone, and extracts the second fingerprint data from the application service acquisition request.

Step 109: According to information of the user mobile phone (for example, a mobile phone number, and the like), the wireless application protocol gateway acquires the security authentication data saved locally.

Step 111: The wireless application protocol gateway acquires the encryption key KEY according to the second fingerprint data and the security authentication data, which specifically includes:

Extract a minutiae set $Q = \{(x_{q0}, y_{q0}), (x_{q1}, y_{q1}), \ldots, (x_{zN^*-1}, y_{qN^*-1})\}$ from the second fingerprint data, where $N^*$ is the total number of the minutiae in Q. $N^*$ is not equal to the total number N of the minutiae in the first fingerprint data. Map minutiae plane coordinates $x_i$ and $y_i (i=0, \ldots, N^*-1)$ into [0, 255].

Extract $v_0, v_1, \ldots, v_{M+N-1}$ out from the security authentication data VL. Respectively split $v_0, v_1, v_{M+N-1}$ into two 8 bit numbers which are served as plane coordinates, and a set $R_C = \{(x_{v0}, y_{v0}), (x_{v1}, y_{v1}), \ldots, (x_{v(M+N-1)}, y_{v(M+N+1)})\}$ may be obtained.

Use the elements in Q to locate elements belonging to true user fingerprint information in $R_C$. If a distance between a certain minutiae A in the set Q and a certain minutiae B in the set $R_C$ is smaller than a preset threshold value, then it is determined that A and B are a pair of matching points, and (v, w) corresponding to B may be added into a matching point set $R_G$, that is: For all $0 \leq i < N^*$, $((x_{qi}, y_{qi})$ belong to Q), and for $0 \leq j < V+M$, $((x_{vj}, y_{vi})$ belong to $R_c$).

If $D((x_{qi}, y_{qi}), (x_{vj}, y_{vi})) \leq T$, then $(v_j, w_j)$ belong to $R_G$. T is a threshold value. $D((x_{qi}, y_{qi}), (x_{vj}, y_{vi}))$ represents a distance between the two points.

According to the foregoing algorithm, a set of nine points $R_G = \{(v_0, w_0), \{v_1, w_1), \ldots, (v_8, w_8)\}$ may be obtained. Elements in $R_G$ are from true user fingerprints. Restore the encryption key KEY by using the elements in the set $R_G$. For each $v_i \in R_G$, the 16 bit random number generator same with the random number generator is used to generate eight random numbers $r_{i1}, r_{i2}, \ldots, r_{i8}$ by using $v_i$ as a seed. In this way, a vector $u_{vi}$ may be obtained for each vi belongs to $R_G$:

$$u_{vi}=[u_{i0}u_{i1}\ldots u_{i8}]=[v_i r_{i1}\ldots r_{i8}]$$

And a corresponding encryption function value $w_1$ may be obtained:

$$w_i=f(u_{vi})=a_d^T u_{vi} \bmod(p)(a_{d0}u_{i0}+a_{d1}u_{i1}+\ldots+a_{d7}u_{i7}+a_{d8}u_{i8})\bmod(p)$$

An equation set is obtained:

$$w_0=(a_{d0}u_{0,0}+a_{d1}u_{0,1}+\ldots+a_{d7}u_{0,7}+a_{d8}u_{0,8})\bmod(p)$$

$$w_1=(a_{d0}u_{1,0}+a_{d1}u_{1,1}+\ldots+a_{d7}u_{1,7}+a_{d8}u_{1,8})\bmod(p)$$

$$w_8=(a_{d0}u_{8,0}+a_{d1}u_{d1}+\ldots+a_{d7}u_{8,7}+a_{d8}u_{8,8})\bmod(p)$$

$$\text{Set } U = \begin{pmatrix} u_{0,0} & \ldots & u_{0,8} \\ \ldots & \ldots & \ldots \\ u_{8,0} & \ldots & u_{8,8} \end{pmatrix},$$

$w=[w_0\ w_1\ \ldots\ w_8]^T$, $a_d=[a_{d0}\ a_{d1}\ \ldots\ a_{d8}]^T$, the foregoing equation set may be simplified as:

$$w=Ua_d^T \bmod(p) \qquad (3)$$

Since $v_0, \ldots, v_8$ which serve as seeds are not the same, each line of the random matrix U is irrelevant. That is, a determinant $|U|\neq 0$. In this way, U may be guaranteed to be reversible, thus solving $a^T$ from (3):

$$a_d^T=U^{-1}w \bmod(p) \qquad (4)$$

Because $(v_0, w_0), \ldots, (v_8, w_8)$ are elements in G, there is $a_d^T=a^T$.

Connect $a_{d0}, a_{d1}, \ldots, a_{d7}$ into a string KEY in series, wherein KEY=KEY. In this way, the encryption key KEY is restored.

Step 113: The wireless application protocol gateway decrypts the encrypted fingerprint template according to the obtained encryption key KEY, so as to obtain the fingerprint template of the user.

Step 115: The wireless application protocol gateway compares the acquired second fingerprint data with the fingerprint template of the user, determines that the user identity authentication is passed when a comparison result is that the two are matched, and sends the application service acquisition request to the application server.

Step 117: The application server sends a requested application service to the wireless application protocol gateway according to the application service acquisition request.

Step 119: The wireless application protocol gateway provides the application service to the user mobile phone.

According to a method for providing application service in the embodiments of the invention, the user is authenticated by the wireless application protocol gateway according to the received application service acquisition request from the user mobile phone, and when the user authentication is passed, the application service acquisition request is sent to the application server, so that the application server provides the application service to the user mobile phone according to the application service acquisition request. The application server does not need to authenticate the user mobile phone by performing an authentication operation on the user mobile phone through the wireless application protocol gateway, thus being capable of reducing the workload of the application server. In addition, the user registers the first fingerprint data to the wireless application protocol gateway. The wireless application protocol gateway acquires the encrypted fingerprint template of the user and the encryption key KEY corresponding to the encrypted fingerprint template. The wireless application protocol gateway generates security authentication data for the encryption key by using the first fingerprint data to conceal the encryption key, so that the encryption key is protected more rigorously. During authentication, the security authentication data is decrypted to obtain the encryption key by using the second fingerprint data of the user, and the encrypted fingerprint template is decrypted to obtain a fingerprint template by using the encryption key, so that an authentication process is more secure and reliable. Moreover, the user only requires inputting fingerprints on the touch screen of the mobile phone, which improves the user experiences.

Embodiment II

Figure 2:
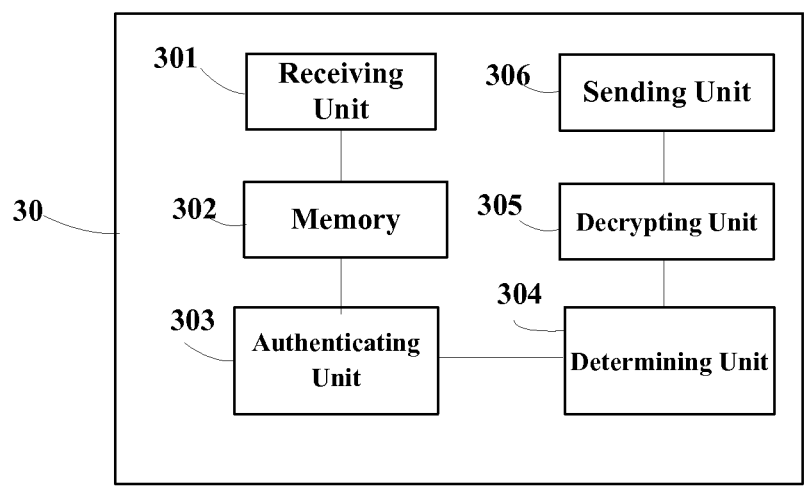
FIG. 2 is a schematic structural view illustrating a wireless application protocol gateway according to the third embodiment of the present invention.

The embodiment provides a method for providing an application service. As shown in FIG. 2, the method includes the following steps:

S201: An application server releases applications on an application management platform. The application management platform forms the applications released by the application server into an application list, so that a user may query and download conveniently. The application management platform is configured to perform management operations on the applications, including application releasing, updating, and the like, and perform management on information of a user mobile phone, including such information as an account number and an account of the user mobile phone, and the like.

S203: A wireless application protocol gateway receives an application query request sent by the user mobile phone through a software platform.

The software platform provides an operating environment for the applications of the user mobile phone, and provides an interface between operating systems, for example, XML (Extensible Markup Language, Extensible Markup Language) parsing, JavaScript engine, AJAX (Asynchronous JavaScript and XML, Asynchronous JavaScript and XML) call engine, cache, graphics library, underlayer device management, multimedia management, security management, and the like; provides necessary component support in an operating process, and perform management on the operating environment of the applications of the user mobile phone; performs management on the applications of the user mobile phone, and is responsible for remotely loading, deleting and updating the applications.

S205: The wireless application protocol gateway sends the application query request to the application management platform so as to acquire the application list.

Further, when a message format of the application query request cannot be recognized by the application management platform, the wireless application protocol gateway firstly converts the application query request into a format which can be recognized by the application management platform, and then sends the converted application query request to the application management platform so as to acquire the application list.

S207: The wireless application protocol gateway receives the application list fed back by the application management platform.

S209: The wireless application protocol gateway sends the application list fed back by the application management platform to the user mobile phone through the software platform.

S211: The wireless application protocol gateway receives an application downloading request sent by the user mobile phone through the software platform.

S213: The wireless application protocol gateway forwards the application downloading request to the application management platform, so that the application management platform sends the applications to the user mobile phone.

Further, when a message format of the application downloading request cannot be recognized by the application management platform, the wireless application protocol gateway firstly converts the application downloading request into a format which can be recognized by the application management platform, and then sends the converted application downloading request to the application management platform.

S215: The wireless application protocol gateway receives the applications sent by the application management platform.

S217: The wireless application protocol gateway sends the applications sent by the application management platform to the user mobile phone through the software platform.

The software platform manages the applications.

S209: The wireless application protocol gateway receives an application service request sent by the user mobile phone through the software platform.

S211. The wireless application protocol gateway authenticates the user mobile phone according to the application service acquisition request.

To be specific, the application service acquisition request includes identity information of the user mobile phone, for example: information such as number, IP address, and the like; relevant information of the application server requiring being accessed, for example: such information as the IP address, and the like; and relevant information of the applications, for example: information such as application names, and the like.

The wireless application protocol gateway, based on self authentication strategies and according to the identity information of the user mobile phone as well as relevant information of the application server requiring access, judges whether the user mobile phone is a user allowed by the application server, that is, whether the application server is allowed to provide an application service for the user mobile phone. Moreover, the wireless application protocol gateway judges whether the application server can provide the application service corresponding to the applications for the user mobile phone according to relevant information of the applications. When judging the user mobile phone is legal, the wireless application protocol gateway is allowed to provide the application service for the user mobile phone. The application server can provide the application service corresponding to the application to the user mobile phone.

S223: When the authentication of the user mobile phone is passed, the wireless application protocol gateway sends the application service acquisition request to the application server, so that the application server provides the application service to the user mobile phone according to the application service acquisition request. Further, when a message format of the application service acquisition request cannot be recognized by the application server, the wireless application protocol gateway firstly converts the application service acquisition request into a format which can be recognized by the application server, and then sends the converted application service acquisition request to the application server.

S225: The application server provides the application service to the user mobile phone according to the application service acquisition request.

According to the method for providing application service in the embodiments of the invention, the wireless application protocol gateway may further perform format conversion on a request message sent to the application management platform or the application server by the user mobile phone, thus being capable of performing adaption between the user mobile phone and different application management platforms or application servers, thereby increasing the user experience quality.

Embodiment III

An embodiment provides a wireless application protocol gateway. As shown in FIG. 2, the wireless application protocol gateway includes: a receiving unit 301, a memory 302, an authenticating unit 303, a determining unit 304, a decrypting unit 305 and a sending unit 306, wherein:

the receiving unit 301 is configured to receive first fingerprint data generated by a user mobile phone;

the memory 302 is configured to store an encrypted fingerprint template of the user and an encryption key KEY corresponding to the encrypted fingerprint template both of which are acquired from an application server through an encrypted channel; wherein the encryption key KEY is generated randomly by the application server; a length of the encryption key KEY is 128 bits; the encrypted fingerprint template is generated after the application server uses the encryption key KEY to encrypt a user fingerprint template;

the authenticating unit 303 is configured to generate security authentication data according to the first fingerprint data and the encryption key; wherein authenticating unit 303 specifically is configured to:

split the encryption key KEY into eight non-overlapping segments, which are respectively $s_0, s_1, \ldots, s_7$, each segment has 16 bits; set $a_0=s_0, a_1=s_1, \ldots, a_7=s_7$; to connect $a_0$-$a_7$ into a 128 bit string KEYC=$a_0 \, a_1 \ldots a_7$;

calculate a cyclic redundancy check CRC-16 value C of the string KEYC, wherein C is a 16 bit check value;

set $a_8=C \bmod(p)$, wherein P is a prime number 65537 that is proximate to $2^{16}-1$ but larger than $2^{16}-1$;

acquire a set $F=\{(x_0, y_0), (x_1, y_1), \ldots, (x_{N-1}, y_{N-1})\}$ of minutiae plane coordinates in the first fingerprint data of the user, where $x_i, y_i (i=0, \ldots, N-1)$ are respectively minutiae plane coordinates, and N is the total number of the minutiae, each minutiae plane coordinate is respectively mapped into [0, 255] and the mapped plane coordinates are connected in series together to constitute 16 bit data $m_i$ and obtain a set $H=\{m_0, m_1, \ldots, m_{N-1}\}$;

take each mi($i=0, \ldots, N-1$) as a 16 bit random number generator seed to generate eight random numbers $r_{i1}, r_{i2}, \ldots, r_{i8}$ in sequence, and obtain a vector $u_i:u_i(m_i)=[u_{i0} \, u_{i1} \ldots u_{i8}]=[m_i \, r_{i1} \ldots r_{i8}]$;

substitute each $u_i$ into the encryption function f(u) to calculate a corresponding encryption function value $f(u_i)$, and obtain a set G of the user encrypted fingerprint data constituted by the set H and the encryption function value corresponding to the elements thereinto, and $G=((m_0, f(u_0(m_0))), (m_1, f(u_1(m_1))), \ldots, (m_{N-1}, f(u_{N-1}(m_{N-1}))))$, wherein f(u) is an encryption function of nine variables, and $f(u)=a^T u \bmod(p)=(a_0 u_0+a_1 u_1+ \ldots a_7 u_7+a_8 u_8) \bmod(p)$.

generate an interference set $C=((c_0, d_0), (c_1, d_1), \ldots, (c_{M-1}, d_{M-1}))$, wherein M is the number of elements of the set C; $c_i$ and $d_i$(i=0, ..., M−1) are random numbers, and a distance between $c_i$ and $m_i$ is larger than a preset threshold value, and $d_i \neq f(c_i)$;

mix the elements in the set G and in the set C randomly, to generate the security authentication data VL={$(v_0, w_0)$, $(v_1, w_1), \ldots, (v_{M+N-1}, w_{M+N-1})$}, wherein $(v_i, w_i)$(i=0, ..., M−1) represent the elements in the set G and in the set C;

save the security authentication data in the memory 302; and destroy the encryption key.

the determining unit 304 is configured to receive an application service acquisition request carrying second fingerprint data from a user mobile phone, extract the second fingerprint data from the application service acquisition request; acquire the security authentication data saved locally, according to information of the user mobile phone; compute the encryption key KEY according to the second fingerprint data and the security authentication data, wherein the process of compute the encryption key KEY specifically includes:

extracting a minutiae set Q from the second fingerprint data, wherein Q={$(x_{q0}, y_{q0})$, $(x_{q1}, y_{q1})$, ..., $(x_{z_{N^*-1}}, y_{q_{N^*-1}})$}, $N^*$ is the total number of the minutiae in Q, $N^*$ is not equal to the total number N of the minutiae in the first fingerprint data; mapping minutiae plane coordinates $x_k$ and $y_k$ into [0, 255], wherein k=0, 1, 2, ..., N−1;

extracting $v_0, v_1, \ldots, v_{M+N-1}$ out from the security authentication data VL; splitting $v_0, v_1, \ldots, v_{M+N-1}$ respectively into two 8 bit numbers which are served as plane coordinates, obtaining a set $R_C$={$(x_{v0}, y_{v0})$, $(x_{v1}, y_{v1})$, ..., $(x_{v(M+N-1)}, y_{v(M+N-1)})$};

if a distance between a certain minutiae A in the set Q and a certain minutiae B in the set $R_C$ is smaller than a preset threshold value, determining that A and B are a pair of matching points; adding (v, w) corresponding to B into a matching point set $R_G$ to obtain a set of nine points $R_G$={$(v_0, w_0)$, $(v_1, w_1), \ldots, (v_8, w_8)$}.

restoring the encryption key KEY by using the elements in the set $R_G$; wherein the step of restoring the encryption key KEY by using the elements in the set $R_G$ comprises:

for each $v_i \epsilon R_G$, using the 16 bit random number generator same as the random number generator to generate eight random numbers $r_{i1}, r_{i2}, \ldots, r_{i8}$ by using $v_i$ as a seed; obtaining an equation set:

$$w_0 = (a_{d0}u_{0,0} + a_{d1}u_{0,1} + \ldots + a_{d7}u_{0,7} + a_{d8}u_{0,8}) \bmod(p)$$

$$w_1 = (a_{d0}u_{1,0} + a_{d1}u_{1,1} + \ldots + a_{d7}u_{1,7} + a_{d8}u_{1,8}) \bmod(p)$$

$$w_8 = (a_{d0}u_{8,0} + a_{d1}u_{d1} + \ldots + a_{d7}u_{8,7} + a_{d8}u_{8,8}) \bmod(p)$$

solving $a^T$:

$$a_d^T = U^{-1} w \bmod(p)$$

wherein $$U = \begin{pmatrix} u_{0,0} & \cdots & u_{0,8} \\ \cdots & \cdots & \cdots \\ u_{8,0} & \cdots & u_{8,8} \end{pmatrix},$$

$w = [w_0 \; w_1 \; \ldots \; w_8]^T$, $a_d = [a_{d0} \; a_{d1} \; \ldots \; a_{d8}]^T$ connecting $a_{d0}, a_{d1}, \ldots, a_{d7}$ into a string KEY in series. In this way, the encryption key KEY is restored.

the decrypting unit 305 is configured to decrypt the encrypted fingerprint template according to the obtained encryption key KEY, so as to obtain the fingerprint template of the user; compare the acquired second fingerprint data with the fingerprint template of the user, determine that the user identity authentication is passed when a comparison result is that the two are matched, and send the application service acquisition request to the application server.

the sending unit 306 is configured to provide the application service obtained from the application server, to the user mobile phone.

Optionally, the decrypting unit 305 is further configured to determine to refuse to provide application service to the user when the comparison result is that the two are not matched, and send message that the application service is refused to the user mobile phone.

Optionally, the wireless application protocol gateway 30 is further configured to send the application query request to the application management platform so as to acquire the application list.

Further, when a message format of the application query request cannot be recognized by the application management platform, the wireless application protocol gateway firstly converts the application query request into a format which can be recognized by the application management platform, and then sends the converted application query request to the application management platform so as to acquire the application list.

The wireless application protocol gateway 30 is further configured to receive, through the receiving unit 301, the application list fed back by the application management platform.

The wireless application protocol gateway 30 is further configured to send the application list fed back by the application management platform to the user mobile phone through the software platform.

Further, when a message format of the application downloading request cannot be recognized by the application management platform, the wireless application protocol gateway is configured to convert the application downloading request into a format which can be recognized by the application management platform, and then send the converted application downloading request to the application management platform. The wireless application protocol gateway receives the applications sent by the application management platform. The wireless application protocol gateway sends the applications sent by the application management platform to the user mobile phone through the software platform. The software platform manages the applications.

The wireless application protocol gateway is configured to receive, through the receiving unit 301, an application service request sent by the user mobile phone through the software platform. The wireless application protocol gateway is configured to authenticate the user mobile phone according to the application service acquisition request.

To be specific, the application service acquisition request includes identity information of the user mobile phone, for example: information such as number, IP address, and the like; relevant information of the application server requiring being accessed, for example: such information as the IP address, and the like; and relevant information of the applications, for example: information such as application names, and the like.

The wireless application protocol gateway, based on self authentication strategies and according to the identity information of the user mobile phone as well as relevant information of the application server requiring access, judges whether the user mobile phone is a user allowed by the application server, that is, whether the application server is allowed to provide an application service for the user mobile phone. Moreover, the wireless application protocol gateway judges whether the application server can provide the application service corresponding to the applications for the user mobile phone according to relevant information of the applications. When judging the user mobile phone is legal, the wireless application protocol gateway is allowed to provide the application service for the user mobile phone. The application server can provide the application service corresponding to the application to the user mobile phone.

When the authentication of the user mobile phone is passed, the wireless application protocol gateway is configured to send the application service acquisition request to the application server, so that the application server provides the application service to the user mobile phone according to the application service acquisition request.

Optionally, the determining unit 304 is further configured to receive the application service acquisition request from the user mobile phone through the software platform.

Optionally, the determining unit 304 is further configured to receive an application query request sent by the user mobile phone through the software platform.

Further, when a message format of the application query request cannot be recognized by the application management platform, the determining unit 304 is further configured to convert the application query request into a format which can be recognized by the application management platform, and then send the converted application query request to the application management platform so as to acquire the application list.

According to the wireless application protocol gateway in the embodiment of the invention, the user is authenticated by the wireless application protocol gateway according to the received application service acquisition request from the user mobile phone, and when the user authentication is passed, the application service acquisition request is sent to the application server, so that the application server provides the application service to the user mobile phone according to the application service acquisition request. The application server does not need to authenticate the user mobile phone by performing an authentication operation on the user mobile phone through the wireless application protocol gateway, thus being capable of reducing the workload of the application server. In addition, the user registers the first fingerprint data to the wireless application protocol gateway. The wireless application protocol gateway acquires the encrypted fingerprint template of the user and the encryption key KEY corresponding to the encrypted fingerprint template. The wireless application protocol gateway generates the security authentication data for the encryption key by using the first fingerprint data to conceal the encryption key, so that the encryption key is protected more rigorously. During authentication, the security authentication data is decrypted to obtain the encryption key by using the second fingerprint data of the user, and the encrypted fingerprint template is decrypted to obtain a fingerprint template by using the encryption key, so that an authentication process is more secure and reliable. Moreover, the user only requires inputting fingerprints on the touch screen of the mobile phone, which improves the user experiences.

Figure 3:
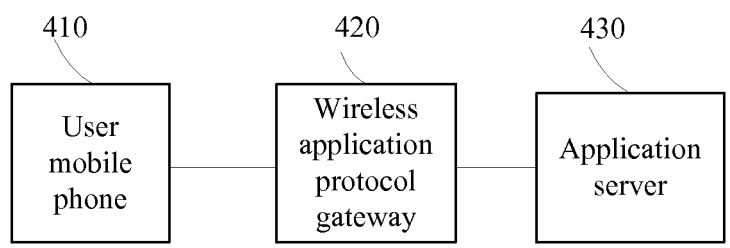
FIG. 3 is a schematic structural view illustrating a communication system according to the fourth embodiment of the present invention.

An embodiment provides a network system, as shown in FIG. 3. The system includes: a user mobile phone 410, a wireless application protocol gateway 420 and an application server 430, wherein the user mobile phone is configured to send first fingerprint data to the wireless application protocol gateway 420, and the wireless application protocol gateway 420 includes: a receiving unit 301, a memory 302, an authenticating unit 303, a determining unit 304, a decrypting unit 305 and a sending unit 306, wherein:

the receiving unit 301 is configured to receive the first fingerprint data generated by the user mobile phone;

the memory 302 is configured to store an encrypted fingerprint template of the user and an encryption key KEY corresponding to the encrypted fingerprint template both of which are acquired from an application server through an encrypted channel; wherein the encryption key KEY is generated randomly by the application server; a length of the encryption key KEY is 128 bits; the encrypted fingerprint template is generated after the application server uses the encryption key KEY to encrypt a user fingerprint template;

the authenticating unit 303 is configured to generate security authentication data according to the first fingerprint data and the encryption key; wherein authenticating unit 303 specifically is configured to:

split the encryption key KEY into eight non-overlapping segments, which are respectively $s_0, s_1, \ldots, s_7$, each segment has 16 bits; set $a_0=s_0, a_1=s_1, \ldots, a_7=s_7$; to connect $a_0$-$a_7$ into a 128 bit string KEYC=$a_0 a_1 \ldots a_7$;

calculate a cyclic redundancy check CRC-16 value C of the string KEYC, wherein C is a 16 bit check value;

set $a_8$=C mod(p), wherein P is a prime number 65537 that is proximate to $2^{16}-1$ but larger than $2^{16}-1$;

acquire a set F=$\{(x_0, y_0), (x_1, y_1), \ldots, (x_{N-1}, y_{N-1})\}$ of minutiae plane coordinates in the first fingerprint data of the user, where $x_i, y_i$(i=0, . . . , N-1) are respectively minutiae plane coordinates, and N is the total number of the minutiae, each minutiae plane coordinate is respectively mapped into [0, 255] and the mapped plane coordinates are connected in series together to constitute 16 bit data $m_i$ and obtain a set H=$\{m_0, m_1, \ldots, m_{N-1}\}$;

take each mi(i=0, . . . , N-1) as a 16 bit random number generator seed to generate eight random numbers $r_{i1}, r_{i2}, \ldots, r_{i8}$ in sequence, and obtain a vector $u_i$:$u_i(m_i)$=[$u_{i0}$ $u_{i1} \ldots u_{i8}$]=[$m_i$ $r_{i1} \ldots r_{i8}$];

substitute each $u_i$ into the encryption function f(u) to calculate a corresponding encryption function value $f(u_i)$, and obtain a set G of the user encrypted fingerprint data constituted by the set H and the encryption function value corresponding to the elements thereinto, and G=(($m_0$, $f(u_0(m_0))$), ($m_1$, $f(u_1(m_1))$), . . . , ($m_{N-1}$, $f(u_{N-1}(m_{N-1}))$)), wherein f(u) is an encryption function of nine variables, and f(u)=$a^T u$ mod(p)=($a_0 u_0 + a_1 u_1 + \ldots a_7 u_7 + a_8 u_8$)mod(p);

generate an interference set C=(($c_0, d_0$), ($c_1, d_1$), . . . , ($c_{M-1}, d_{M-1}$)), wherein M is the number of elements of the set C; $c_i$ and $d_i$(i=0, . . . , M-1) are random numbers, and a distance between $c_i$ and $m_i$ is larger than a preset threshold value, and $d_i \neq f(c_i)$;

mix the elements in the set G and in the set C randomly, to generate the security authentication data VL=$\{(v_0, w_0), (v_1, w_1), \ldots, (v_{M+N-1}, w_{M+N-1})\}$, wherein $(v_i, w_i)$(i=0, . . . , M-1) represent the elements in the set G and in the set C;

save the security authentication data locally; and destroy the encryption key.

the determining unit 304 is configured to receive an application service acquisition request carrying second fingerprint data from a user mobile phone, extract the second fingerprint data from the application service acquisition request; acquire the security authentication data saved locally, according to information of the user mobile phone; compute the encryption key KEY according to the second fingerprint data and the security authentication data, wherein the process of compute the encryption key KEY specifically includes:

extracting a minutiae set Q from the second fingerprint data, wherein $Q=\{(x_{q0}, y_{q0}), (x_{q1}, y_{q1}), \ldots, (z_{qN^*-1}, y_{qN^*-1})\}$, N* is the total number of the minutiae in Q, N* is not equal to the total number N of the minutiae in the first fingerprint data; mapping minutiae plane coordinates $x_k$ and $y_k$ into [0, 255], wherein k=0, 1, 2, ..., N−1;

extracting $v_0, v_1, \ldots, v_{M+N-1}$ out from the security authentication data VL; splitting $v_0, v_1, \ldots, v_{M+N-1}$ respectively into two 8 bit numbers which are served as plane coordinates, obtaining a set $R_C=\{(x_{v0}, y_{v0}), (x_{v1}, y_{v1}), \ldots, (x_{v(M+N-1)}, y_{v(M+N-1)})\}$;

if a distance between a certain minutiae A in the set Q and a certain minutiae B in the set $R_C$ is smaller than a preset threshold value, determining that A and B are a pair of matching points; adding (v, w) corresponding to B into a matching point set $R_G$ to obtain a set of nine points $R_G=\{(v_0, w_0), (v_1, w_1), \ldots, (v_8, w_8)\}$.

restoring the encryption key KEY by using the elements in the set $R_G$; wherein the step of restoring the encryption key KEY by using the elements in the set $R_G$ comprises:

for each $v_i \epsilon R_G$, using the 16 bit random number generator same as the random number generator to generate eight random numbers $r_{i1}, r_{i2}, \ldots, r_{i8}$ by using $v_i$ as a seed; obtaining an equation set:

$$w_0=(a_{d0}u_{0,0}+a_{d1}u_{0,1}+\ldots+a_{d7}u_{0,7}+a_{d8}u_{0,8})\mod(p)$$

$$w_1=(a_{d0}u_{1,0}+a_{d1}u_{1,1}+\ldots+a_{d7}u_{1,7}+a_{d8}u_{1,8})\mod(p)$$

$$w_8=(a_{d0}u_{8,0}+a_{d1}u_{d1}+\ldots+a_{d7}u_{8,7}+a_{d8}u_{8,8})\mod(p)$$

solving $a^T$:

$$a_d^T=U^{-1}w \mod(p)$$

wherein $$U = \begin{pmatrix} u_{0,0} & \ldots & u_{0,8} \\ \ldots & \ldots & \ldots \\ u_{8,0} & \ldots & u_{8,8} \end{pmatrix},$$

$w=[w_0 \ w_1 \ \ldots \ w_8]^T$, $a_d=[a_{d0} \ a_{d1} \ \ldots \ a_{d8}]^T$ connecting $a_{d0}, a_{d1}, \ldots, a_{d7}$ into a string KEY in series. In this way, the encryption key KEY is restored.

the decrypting unit 305 is configured to decrypt the encrypted fingerprint template according to the obtained encryption key KEY, so as to obtain the fingerprint template of the user; compare the acquired second fingerprint data with the fingerprint template of the user, determine that the user identity authentication is passed when a comparison result is that the two are matched, and send the application service acquisition request to the application server.

the sending unit 306 is configured to provide the application service obtained from the application server, to the user mobile phone.

Optionally, the decrypting unit 305 is further configured to determine to refuse to provide application service to the user when the comparison result is that the two are not matched, and send message that the application service is refused to the user mobile phone.

Optionally, the wireless application protocol gateway 30 is further configured to send the application query request to the application management platform so as to acquire the application list.

Further, when a message format of the application query request cannot be recognized by the application management platform, the wireless application protocol gateway firstly converts the application query request into a format which can be recognized by the application management platform, and then sends the converted application query request to the application management platform so as to acquire the application list.

The wireless application protocol gateway 30 is further configured to receive, through the receiving unit 301, the application list fed back by the application management platform.

The wireless application protocol gateway 30 is further configured to send the application list fed back by the application management platform to the user mobile phone through the software platform.

Further, when a message format of the application downloading request cannot be recognized by the application management platform, the wireless application protocol gateway is configured to convert the application downloading request into a format which can be recognized by the application management platform, and then send the converted application downloading request to the application management platform. The wireless application protocol gateway receives the applications sent by the application management platform. The wireless application protocol gateway sends the applications sent by the application management platform to the user mobile phone through the software platform. The software platform manages the applications.

The wireless application protocol gateway is configured to receive, through the receiving unit 301, an application service request sent by the user mobile phone through the software platform. The wireless application protocol gateway is configured to authenticate the user mobile phone according to the application service acquisition request.

To be specific, the application service acquisition request includes identity information of the user mobile phone, for example: information such as number, IP address, and the like; relevant information of the application server requiring being accessed, for example: such information as the IP address, and the like; and relevant information of the applications, for example: information such as application names, and the like.

The wireless application protocol gateway, based on self authentication strategies and according to the identity information of the user mobile phone as well as relevant information of the application server requiring access, judges whether the user mobile phone is a user allowed by the application server, that is, whether the application server is allowed to provide an application service for the user mobile phone. Moreover, the wireless application protocol gateway judges whether the application server can provide the application service corresponding to the applications for the user mobile phone according to relevant information of the applications. When judging the user mobile phone is legal, the wireless application protocol gateway is allowed to provide the application service for the user mobile phone. The application server can provide the application service corresponding to the application to the user mobile phone.

When the authentication of the user mobile phone is passed, the wireless application protocol gateway is configured to send the application service acquisition request to the application server, so that the application server provides the application service to the user mobile phone according to the application service acquisition request.

Optionally, the determining unit 304 is further configured to receive the application service acquisition request from the user mobile phone through the software platform.

Optionally, the determining unit 304 is further configured to receive an application query request sent by the user mobile phone through the software platform.

Further, when a message format of the application query request cannot be recognized by the application management platform, the determining unit 304 is further configured to convert the application query request into a format which can be recognized by the application management platform, and then send the converted application query request to the application management platform so as to acquire the application list.

According to the wireless application protocol gateway in the embodiment of the invention, the user is authenticated by the wireless application protocol gateway according to the received application service acquisition request from the user mobile phone, and when the user authentication is passed, the application service acquisition request is sent to the application server, so that the application server provides the application service to the user mobile phone according to the application service acquisition request. The application server does not need to authenticate the user mobile phone by performing an authentication operation on the user mobile phone through the wireless application protocol gateway, thus being capable of reducing the workload of the application server. In addition, the user registers the first fingerprint data to the wireless application protocol gateway. The wireless application protocol gateway acquires the encrypted fingerprint template of the user and the encryption key KEY corresponding to the encrypted fingerprint template. The wireless application protocol gateway generates the security authentication data for the encryption key by using the first fingerprint data to conceal the encryption key, so that the encryption key is protected more rigorously. During authentication, the security authentication data is decrypted to obtain the encryption key by using the second fingerprint data of the user, and the encrypted fingerprint template is decrypted to obtain a fingerprint template by using the encryption key, so that an authentication process is more secure and reliable. Moreover, the user only requires inputting fingerprints on the touch screen of the mobile phone, which improves the user experiences.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read Only Memory (ROM), a Random Access Memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A method for providing application service, comprising:

registering user fingerprint information to a wireless application protocol gateway;

inputting, in a user mobile phone, application service information to be acquired, and inputting fingerprints on a touch screen of the user mobile phone;

collecting, by the user mobile phone, the user fingerprints to generate second fingerprint data of the user, carrying the second fingerprint data in an application service acquisition request, and sending the application service acquisition request to the wireless application protocol gateway through an encrypted channel;

receiving, by the wireless application protocol gateway, the application service acquisition request carrying the second fingerprint data from the user mobile phone, and extracting the second fingerprint data from the application service acquisition request;

acquiring, by the wireless application protocol gateway, the security authentication data stored locally, according to information of the user mobile phone;

acquiring, by the wireless application protocol gateway, the encryption key KEY according to the second fingerprint data and the security authentication data;

decrypting, by the wireless application protocol gateway, the encrypted fingerprint template according to the obtained encryption key KEY, to obtain the fingerprint template of the user;

comparing, by the wireless application protocol gateway, the acquired second fingerprint data with the fingerprint template of the user, determining that the user identity authentication is passed when a comparison result is that the two are matched, and sending the application service acquisition request to the application server;

sending, by the application server, requested application service to the wireless application protocol gateway according to the application service acquisition request;

providing, by the wireless application protocol gateway, the application service to the user mobile phone;

wherein the registering user fingerprint information to a wireless application protocol gateway comprises:

inputting, by the user, fingerprints on a touch screen of a user mobile phone; generating, by the user mobile phone, first fingerprint data of the user, and sending the first fingerprint data to the wireless application protocol gateway through an encrypted channel;

acquiring, by the wireless application protocol gateway, an encrypted fingerprint template of the user and an encryption key KEY corresponding to the encrypted fingerprint template from an application server through the encrypted channel, and saving the encrypted fingerprint template locally, wherein the encryption key KEY is generated randomly by the application server, the length of the encryption key KEY is 128 bits, and the encrypted fingerprint template is generated after the application server uses the encryption key KEY to encrypt a user fingerprint template;

generating, by the wireless application protocol gateway, security authentication data according to the first fingerprint data and the encryption key; saving the security authentication data locally; and destroying the encryption key;

and wherein the generating, by the wireless application protocol gateway, security authentication data according to the first fingerprint data and the encryption key;

saving the security authentication data locally; and destroying the encryption key comprises:

generating, by the wireless application protocol gateway, an encryption function of nine variables:

$$f(u)=a^T u \bmod(p)=(a_0 u_0+a_1 u_1+\ldots a_7 u_7+a_8 u_8) \bmod(p),$$

wherein $a=[a_0\ a_1\ \ldots\ a_8]^T$, $u=[u_0\ u_1\ \ldots\ u_8]$, and mod represents a modulo operation;

splitting the encryption key KEY into eight non-overlapping segments, which are respectively $s_0, s_1, \ldots, s_7$, wherein each segment has 16 bits;

setting $a_0=s_0, a_1=s_1, \ldots, a_7=s_7$;

connecting $a_0$-$a_7$ into a 128 bit string KEYC=$a_0\ a_1\ \ldots\ a_7$;

calculating a cyclic redundancy check CRC-16 value C of the string KEYC, wherein C is a 16 bit check value;

setting $a_8$=C mod(p), wherein P is a prime number 65537;

acquiring a set $F=\{(x_0, y_0), (x_1, y_1), \ldots, (x_{N-1}, y_{N-1})\}$ of minutiae plane coordinates in the first fingerprint data of the user, wherein $(x_i, y_i)$ (i=0, ..., N-1) are respectively minutiae plane coordinates, $x_i$ is the $i^{th}$ coordinate value of X axis of a minutiae plane coordinate, $y_i$ is the $i^{th}$ coordinate value of Y axis of a minutiae plane coordinate, and N is the total number of the minutiae;

mapping each minutiae plane coordinate respectively into [0, 255];

connecting the mapped plane coordinates in series together to constitute 16 bit data $m_i$, and obtaining a set $H=\{m_0, m_1, \ldots, m_{N-1}\}$;

taking each $m_i$(i=0, ..., N-1) as a 16 bit random number generator seed to generate eight random numbers $r_{i1}, r_{i2}, \ldots, r_{i8}$ in sequence, and obtaining a vector $u_i$, wherein $u_i(m_i)=[u_{i0}\ u_{i1}\ \ldots\ u_{i8}]=[m_i\ r_{i1}\ \ldots\ r_{i8}]$;

substituting each $u_i$ into the encryption function f(u) to calculate a corresponding encryption function value $f(u_i)$, and obtaining a set G, wherein G is a set of the user encrypted fingerprint data constituted by the set H and the encryption function value corresponding to the elements in the set H, and $G=((m_0, f(u_0(m_0))), (m_1, f(u_1(m_1))), \ldots, (m_{N-1}, f(u_{N-1}(m_{N-1}))))$;

generating an interference set $C=((c_0, d_0), (c_1, d_1), \ldots, (c_{M-1}, d_{M-1}))$, wherein M is the number of elements of the set C; $c_i$ and $d_i$(i=0, ..., M-1) are random numbers, and a distance between $c_i$ and $m_i$ is larger than a preset threshold value, and $d_i \neq f(c_i)$;

mixing the elements in the set G and in the set C randomly, to generate security authentication data $VL=\{(v_0, w_0), (v_1, w_1), \ldots, (v_{M+N-1}, w_{M+N-1})\}$, wherein $(v_i, w_i)$(i=0, ..., M-1) represent the elements in the set G and in the set C;

saving, by the wireless application protocol gateway, the security authentication data locally;

destroying, by the wireless application protocol gateway, the encryption key;

and wherein the acquiring, by the wireless application protocol gateway, the encryption key KEY according to the second fingerprint data and the security authentication data comprises:

extracting a minutiae set Q from the second fingerprint data, wherein $Q=\{(x_{q0}, y_{q0}), (x_{q1}, y_{q1}), \ldots, (x_{qN^*-1}, y_{qN^*-1})\}$, N* is the total number of the minutiae in Q, N* is not equal to the total number N of the minutiae in the first fingerprint data; mapping minutiae plane coordinates $x_k$ and $y_k$ (i=0, ..., N*-1) into [0, 255], wherein k=0, 1, 2, ..., N-1;

extracting $v_0, v_1, \ldots, v_{M+N-1}$ out from the security authentication data VL; splitting $v_0, v_1, \ldots, v_{M+N-1}$ respectively into two 8 bit numbers which are served as plane coordinates, obtaining a set $R_C=\{(x_{v0}, y_{v0}), (x_{v1}, y_{v1}), \ldots, (x_{v(M+N-1)}, y_{v(M+N-1)})\}$;

if a distance between a certain minutiae A in the set Q and a certain minutiae B in the set $R_C$ is smaller than a preset threshold value, determining that A and B are a pair of matching points; adding (v, w) corresponding to B into a matching point set $R_G$ to obtain a set of nine points $R_G=\{(v_0, w_0), \{v_1, w_1), \ldots, (v_8, w_8)\}$;

restoring the encryption key KEY by using the elements in the set $R_G$; wherein the step of restoring the encryption key KEY by using the elements in the set $R_G$ comprises:

for each $v_i \in R_G$, using the 16 bit random number generator same as the random number generator to generate eight random numbers $r_{i1}, r_{i2}, \ldots, r_{i8}$ by using $v_i$ as a seed;

obtaining an equation set:

$$w_0=(a_{d0}u_{0,0}+a_{d1}u_{0,1}+\ldots+a_{d7}u_{0,7}+a_{d8}u_{0,8})\bmod(p)$$

$$w_1=(a_{d0}u_{1,0}+a_{d1}u_{1,1}+\ldots+a_{d7}u_{1,7}+a_{d8}u_{1,8})\bmod(p)$$

$$w_8=(a_{d0}u_{8,0}+a_{d1}u_{d1}+\ldots+a_{d7}u_{8,7}+a_{d8}u_{8,8})\bmod(p)$$

solving $a^T$:

$$a_d^T=U^{-1}w \bmod(p)$$

wherein $$U = \begin{pmatrix} u_{0,0} & \ldots & u_{0,8} \\ \ldots & \ldots & \ldots \\ u_{8,0} & \ldots & u_{8,8} \end{pmatrix},$$

$w=[w_0\ w_1\ \ldots\ w_8]^T$, $a_d=[a_{d0}\ a_{d1}\ \ldots\ a_{d8}]^T$;

connecting $a_{d0}, a_{d1}, \ldots, a_{d7}$ into a string KEY in series;

and wherein the method further comprises:

refusing, by the wireless application protocol gateway, to provide application service to the user when the comparison result is that the two are not matched, and sending message that the application service is refused to the user mobile phone.

* * * * *